(12) United States Patent
Oppermann et al.

(10) Patent No.: US 6,458,866 B1
(45) Date of Patent: Oct. 1, 2002

(54) POLYURETHANE ELASTOMERS, METHOD OF PRODUCING THEM AND THEIR USE

(75) Inventors: Wilhelm Oppermann, Herrenberg; Frank Hermanutz, Leonberg; Peter Hirt, Schorndorf; Michael Schweizer, Freiberg; Oliver Oess, Stuttgart, all of (DE)

(73) Assignee: Rhodia S.A., Courbevoie Cedex (FR)

( * ) Notice: Subject to any disclaimer, the term of this patent is extended or adjusted under 35 U.S.C. 154(b) by 0 days.

(21) Appl. No.: 09/051,351

(22) PCT Filed: Oct. 9, 1996

(86) PCT No.: PCT/EP96/04383

§ 371 (c)(1),
(2), (4) Date: May 15, 1998

(87) PCT Pub. No.: WO97/13798

PCT Pub. Date: Apr. 17, 1997

(30) Foreign Application Priority Data

Oct. 9, 1995 (DE) .......................... 195 37 608

(51) Int. Cl.[7] .................... C08G 18/32; C08G 18/10; C08G 18/67; C08G 18/82; C08J 3/28

(52) U.S. Cl. ..................... 522/174; 522/97; 522/98; 525/453; 528/61; 528/64; 528/65; 528/75; 528/906

(58) Field of Search ............................ 522/97, 98, 174; 525/453; 528/61, 64, 65, 75, 906

(56) References Cited

U.S. PATENT DOCUMENTS

| | | | | |
|---|---|---|---|---|
| 3,036,042 A | * | 5/1962 | Schmidt et al. | 525/453 |
| 3,658,531 A | * | 4/1972 | Kurtz | 430/18 |
| 3,948,665 A | * | 4/1976 | Richter et al. | 430/271.1 |
| 4,263,423 A | * | 4/1981 | Schwindt et al. | 528/55 |
| 4,366,301 A | * | 12/1982 | Roy et al. | 528/66 |
| 4,714,778 A | * | 12/1987 | Burgoyne, Jr. et al. | 564/305 |
| 4,727,126 A | * | 2/1988 | Chen | 526/302 |
| 4,786,657 A | * | 11/1988 | Hammar et al. | 522/90 |
| 5,001,208 A | * | 3/1991 | Ross et al. | 528/61 |
| 5,028,683 A | * | 7/1991 | Martens et al. | 528/75 |
| 5,086,150 A | | 2/1992 | Frauendorf et al. | 528/49 |
| 5,096,992 A | * | 3/1992 | Ross et al. | 528/59 |

FOREIGN PATENT DOCUMENTS

| | | |
|---|---|---|
| DE | 2800301 | 9/1993 |
| JP | 46007115 | 12/1971 |
| JP | 63105109 | 5/1988 |

OTHER PUBLICATIONS

Saunders et al.; Polyurethanes: Chemistry and Technology, Part II. Technology; Robert E. Krieger Publishing Company; Malabar, Florida; 1983; pp. 700–702.*

Chemiefasern/Textilindustrie, vol. 44, No. 6, 1994, pp. 388–391.

Polyurethanes, Chemistry and Technology, J.H. Saunders, 1983, pp. 700–702.

* cited by examiner

*Primary Examiner*—Rabon Sergent
(74) *Attorney, Agent, or Firm*—Bucknam and Archer (57) ABSTRACT

The invention concerns a polyurethane elastomer containing structural units of type (a), in which: the group —O—$R^1$—O— is a macrodiol group with a molecular weight of approximately 500 to 10000, $R^2$ is a bivalent aliphatic, cycloaliphatic and/or aliphatic-cycloaliphatic group; and X is a short-chain olefinically unsaturated group, Y is NH or O, n is an integer from 1 to 10 and m is an integer of at least 4. The invention also concerns a method of preparing this polyurethane elastomer which can be melt-spun to form fibres or melt-extruded to form foils. The fibres or foils can be exposed to energy-rich radiation such that crosslinking of the polyurethane occurs. Fibres according to the invention display superior properties in terms of textile-mechanical properties, in particular good tensile strength, elongation at tear, residual elongation and heat distortion temperature.

(a)

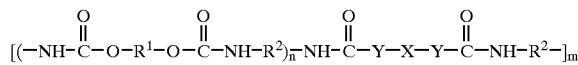

35 Claims, 3 Drawing Sheets

POLYURETHANE ELASTOMERS, METHOD OF PRODUCING THEM AND THEIR USE

FIELD OF THE INVENTION

The invention relates to polyurethane elastomers with specific structural units, a method for their production as well as their use in melt-spin and extrusion processes for the production of films or fibers.

BACKGROUND OF THE PRIOR ART

Polyurethane elastomers are block copolymers built of regularly arranged soft and hard segments. The soft segments comprise long, randomly arranged and flexible chains which lend to the fibers the requisite rubber-like elasticity. The properties can be varied with the relative molar mass and the type of soft segment with respect to elongation and force of elongation. The hard segments are responsible for the restoration of the molecule chains after the deformation. They comprise short-chain crystalline regions. As fixed points, the primary task of the hard segments is preventing the polymer chain from sliding off under the effect of mechanical forces. After a deformative extension the restoring forces present in the elastomer cause a contraction almost to the starting length. The remaining difference in length is referred to as residual elongation.

In general, the polyurethane elastomers are obtained according to a two-stage process in which in a first reaction step higher molecular diols are converted with diisocyanates to prepolymers, which, in a second step, react with so-called chain lengthening means to form high-molecular products. In the first reaction step excess quantities of diisocyanate are used so that the prepolymer is terminated at both ends by an isocyanate group. The chain lengthening means are bifunctional, low-molecular compounds with terminal reactive hydrogen atoms, most often dihydroxy or diamine compounds. They react with the prepolymers to form the corresponding carbamic acid derivatives, i.e. the polyurethane elastomers, respectively polyurea urethane elastomers. In the macromolecule chains the soft segments formed of the higher-molecular diols alternate with the rigid hard segments formed by the reaction of the chain extenders with terminal isocyanate groups.

The different chemical compositions of hard and soft segments as well as their different polarities and molecular weights leads to demixing. Hydrogen bridge bonds between adjacent chains lead to the fact that the hard segments become juxtaposed in parallel. The long mobile molecule chains in between form entanglements and loops which during elongation of the wide-mesh network become detached and elongated. The interaction between hard segments prevents the plastic flow of the molecule chains in the elongated state. The elongation of the macromolecules is tied to a transition into a higher-ordered conformation and a decrease of entropy. Due to the thermal motion of the molecules, they return to the state associated with higher entropy of the looping after relief of loading. Under strong mechanical loading, however, a permanent elongation can occur so that the polymer chains slide off in the elongated state.

The hard segments in polyurethane elastomers have an elongation-limiting cross linking function as well as also a decisive influence on the thermal behavior, respectively the melting range. The urea groups formed when using diarnine chain extenders are more polar than the urethane groupings formed through glycol extension. The stronger hydrogen bridges in the polyurethane elastomers lead to greater demixing occurrences of hard and soft segments, and thus better elastic properties as well as also higher hard segment softening points.

From the literature various spinning methods for the production of elastomer yarns are known. The major portion of the elastomer fibers is produced according to the dry-spin method. Here a highly viscous solution is pressed through multihole nozzles in perpendicularly disposed heated spinning shafts. Simultaneously, hot air is supplied in order to evaporate the solvent and to solidify the filaments. The spinning rate is in the range from approximately 200 to 600 m/min. Due to the low dwelling time in the spinning shaft, and in order to ensure complete solvent removal, the single titers are limited to a maximum of 20 dtex. The production of the end titers takes place by joining corresponding single capillaries with the application of a false torque.

In wet-spinning the prepared polymer solutions are spun into a coagulation bath. The yarns are subsequently washed, bonded one to other and dried. The draw-off rate is approximately 100 m/min.

The reactive spinning method combines a chemical reaction with the spinning process. The prepolymer is extruded through multiple hole nozzles into a spinning bath of, for example, aliphatic diamines. On the surface of the filament an immediate isocyanate-amine reaction to polyurea urethanes take place. The relatively solid skin permits the secure spinning process. The interior of the fiber is cured through treatment with hot water or through the reaction with diamine alcohol or toluene. The spinning rates are in the samerange as in the wet-spinning process.

In melt-spinning the polymer is melted in a cylinder and the melt is pressed through the die plate with gear pumps or extruder worms, the exiting fibers solidify in the air. The advantage of this technology lies in the solvent-free spinning into yarn. This economically significant method has until now not been applied to polyurethane elastomers lengthened with amino-containing chain extenders. These polymers usually decompose before melting due to the high softening point of the hard segments.

Commercially available melt-spun elastomeric polyurethane fibers therefore are based on hydroxyl group-containing chain extenders. F. Foume (Chemiefasern/Textilind. 96 (1994), 392–398) reports about the Japanese manufacturer Kanebo who operates pilot plants in which the polyurethane-ester fiber "Lobell" is obtained according to the melt-spin method. The melt-spun polyether-ester yarns "Rexe" and "Spantel" of the companies Teijin, respectively Kuraray Co., have been available on the market since 1993. The mechanical properties of these fibers are not satisfactory because here in the hard segments urethane groups are present instead of urea groups which, as explained above, lead to lower mechanical stability due to weaker hydrogen bridge bonds.

An improvement of the mechanical textile properties was attained through covalent cross linking of the hard segments (F. Hermanutz, P. Hirt, Chemiefasern/Textilind. 96 (1994), 388–391). By using double bond-containing chain extenders, centers were created for this purpose which are capable of being cross linked. Through electron or UV radiation subsequent polymerization can be triggered after the spinning. These polyurethane elastomers, however, are subject to the restriction that the diamine chain-extending polyurethane elastomers are not melt-spinnable. These known polyurethane elastomers, furthermore, exhibit strong yellowing after exposure to electron or UV radiation.

SUMMARY OF THE INVENTION

It is therefore the object of the present invention to make available polyurethane elastomers which, due to suitable melting points, can advantageously be melt-spun and, optionally following suitable secondary treatment, for example, by radiation with high-energy radiation, lead to fibers with improved mechanical properties.

According to the invention this object is solved through a polyurethane elastomer which comprises structural units of the following type:

wherein:
the grouping —O—$R^1$—O— represents a macrodiol group of a molecular weight from approximately 500 to 10000,
$R^2$ a bivalent aliphatic, cycloaliphatic, and/or aliphatic-cycloaliphatic group; and X a short-chain, olefinically unsaturated group,
Y NH or O as
n an integer from 1 to 10, and
m an integer of at least 4.

In a polyurethane elastomer accordingly the moieties $R^1$, $R^2$ and X are of significance.

The moiety $R^1$ can be traced back to a macrodiol. Preferably linear diols are substantially used which, in addition to the terminal hydroxyl groups, carry no further groups reacting with isocyanates. The macrodiols have a molecular weight of approximately 500 to 10000, preferably approximately 700 to 5000, in particular approximately 1000 to 3000. The molecular weight is to be understood as weight-averaged mean molecular weight. If the macrodiol moieties are too short, the cohesion energy difference between hard and soft segments becomes less which leads to stronger phase mixing and thus poorer elastic properties. Macrodiols with a low second order transition temperature are preferably used.

In general, the second order transition temperature of the macrodiols applied is approximately −35° C. to −60° C. Polyester, and polyether glycols, are preferably used. As polyether glycols are denoted polyethers with terminal hydroxyl groups. Polyalkylene glycols are preferably used. Preferred examples are polyethylene glycol, polypropylene glycol and/or polytetramethylene glycol, of which the latter is especially preferred. Polytetramethylene glycol is also denoted as polytetrahydrodfuran and can be produced through ionic polymerization of tetrahydrofuran with acid catalysts. Suitable copolymers are obtained through copolymerization from tetrahydrofuran with propylene oxide, ethylene oxide and glycols. Elastomers synthesized from polyether glycols are distinguished through advantageous low-temperature behavior and through high hydrolytic stability.

Suitable polyester glycols are preferably produced through esterification of an aliphatic and/or cycloaliphatic dicarboxylic acid with excess quantities of a diol. As preferred dicarboxylic acids are cited succinic acid, glutaric acid, adipic acid, pimelic acid, azelaic acid, and sebacic acid. The dicarboxylic acid is esterified with an excess of diol, preferably ethylene glycol, diethylene glycol, triethylene glycol, propylene glycol, 1,4-butane diol, 1,5-pentane diol and/or 1,6-hexane diol. Especially preferred is a polyester from adipic acid and ethylene glycol. At low temperatures polyester segments tend toward crystallization which impairs the elastic properties. A reduction of the tendency of the polyester chains to crystallize is preferably brought about through the incorporation of methyl branchings. This can take place through the partial replacement of the cited diols by other diols, such as 1,2-propane diol and 2,3-butane diol, or the use of methyl-substituted dicarboxylic acids. By using the cited longer-chain glycols, such as 1,4-butane diol, 1,5-pentane diol and/or 1,6 hexane diol, elastomers with increased hydrolytic stability are obtained. Suitable polyester glycols can also be obtained through the conversion of omega-hydroxy carboxylic acids with small quantities of diols, respectively through ring-opening polymerization of lactones with small quantities of diol. It is also possible to use mixtures of polyether glycols and polyester glycols. With respect to suitable macrodiols reference is also made to Ullmanns Enzyklopädie der technischen Chemie, 3rd Edition, 1963, Publisher Urban & Scharzenberg, München Berlin, Vol. 14, pp. 344.

A polyurethane elastomer according to the invention comprises, in addition, a bivalent aliphatic, cydoaliphatic and/or aliphatic-cydoaliphatic moiety $R^2$. It has surprisingly been found that the moiety $R^2$ also determines significantly the melt behavior and thus the melt-spinnability, respectively melt-extrudability of the polyurethane elastomers. It was additionally found that through the selection of suitable moieties $R^2$ the yellowing during the irradiation with high-energy radiation can be reduced, respectively eliminated. If the moieties $R^2$ comprise aromatic moieties exclusively, the resulting polyurethane elastomers are no longer meltable in a nondecomposed state and thus are not melt-spinnable. In the presence of exdusively aromatic moieties $R^2$ strong yellowing occurs during the secondary treatment with high-energy radiation. Therefore the polyurethane elastomers according to the invention comprise substantially nonaromatic moieties $R^2$. However, in the polyurethane elastomers can be present aromatic moieties $R^2$ up to such fraction that the desired properties of the elastomer are not impaired. Conventionally aromatic moieties are present at less than 20 mole percent, in particular less than 10 mole %, relative to the total quantity of moieties $R^2$. The bivalent moiety $R^2$ is preferably an alkylene group with 2 to 14 carbon atoms, a cycloalkylene group with 5 to 8 carbon atoms and/or an aliphatic-cycloaliphatic group with 7 to 24 carbon atoms. Especially preferred moieties $R^2$ are traced back to a diisocyanate in the form of hexamethylene diisocyanate and/or dicyclohexylmethane-4,4'-diisocyanate.

The polyurethane elastomer according to the invention comprises further a short-chain olefinically unsaturated moiety X. The term "short chain" indicates that the two O—NH—, groups on both sides of the moiety X are at the most 14, in particular 11, bonds. removed from one another. By "olefinic unsaturation" is understood that the moiety comprises one or several double or triple bonds capable of polymerization reactions. The double or triple bond can be in the main chain, however, it can also be disposed in a lateral side group.

The olefinically unsaturated moiety in one embodiment originates from a diaminoalkene, diaminoalkyne and/or diaminocycloalkene. In another embodiment the olefinically unsaturated moiety can be traced back to an alkene diol, alkyne diol, and/or cycloalkene diol. The amino, respectively hydroxy, groups can be located directly on carbon atoms from which the double or triple bonds originate. Such compounds comprise in general further substituents which stabilize the compound electronically. The amino or hydroxy groups can also be separated by one or several bonds from the carbon atoms from which the double or triple bond originates. Preferred examples of suitable diamines are cis- or trans-1,4-diaminobut-2-ene, cis- or trans4,4'-diarninostilbene, diamino maleic acid dinitrile, 1,4-diarminobut-2-ene and/or 3,6-diaminocydohexene-(1). Preferred examples of suitable diols are glycerine-1-allylether, cis- or trans-2-butene-1,4-diol, 2-butyne-1,4-diol and 5,6-bis-(hydroxymethyl)-bicyclo[2.2.1.]heptene-2. It is also possible to use mixtures of unsaturated diamines and/or diols with other amines, respectively diols, as long as the desired properties of the resulting polyurethane elastomer are not impaired.

The number n can be a number between 1 and 10. This represents the number of macrodiol moieties present within one soft segment under consideration. In an elastomer the number n is subject to fluctuations of statistical distribution. It is preferred that the average value of n is small, i.e. between 1 to 6, in particular 1 to 3.

The number of repeating soft segment/hard segment units m in a polyurethane elastomer chain is at least 4, preferably at least 8. Shorter chains cannot be melt-extruded, respectively melt-spun, due to the adhesiveness of the obtained products. m is conventionally in a range from 8 to 75.

Polyurethane elastomers according to the invention can comprise additives in the form of delustering means, color pigments, antioxidation agents, thermostabilizers, photo, respectively UW, stabilizers and/or hydrolysis stabilizers.

Subject matter of the invention is also a process for the production of the above denoted polyurethane elastomers. The polyether or polyester glycols to be used are preferably either already obtained moisture-free or, before the conversion through, for example, azeotropic conversion, are freed of adhering quantities of water. The macrodiol and a diisocyanate OCN—$R^2$—NCO are converted at a molar ratio of approximately 1:5 to 1:1.1, in particular approximately 1:2 to 1:1.1, at a temperature between approximately 60 and 150° C., preferably between approximately 80 and 135° C. The conversion can be carried out without solvents in the melt or in a polar solvent, such as dimethyl formamide or dimethyl acetamide. Optionally a polyaddition catalyst, in particular dibutyltin dilaurate or dibutyltin diacetate, can be added to set a desired reaction level. With conversions in a solvent a catalyst is always required. Depending on the selected molar ratio, the macrodiols are "preextended" (NCO/OH<2) to form prepolymers via urethane or only linked at the chain ends with the diisocyanates (NCO/OH= 2). The conversion is subject to the law of statistical distribution. The molar ratio of macrodiol to diisocyanate is between approximately 1:4 to 1:1.5. Typical molar ratios are approximately 1:4, approximately 1:3, approximately 1:2, approximately 2:3 and approximately 3:5.

The obtained prepolymers are subsequently converted in a second reaction step with an olefinically unsaturated diamine or diol as a chain extender. For this purpose the prepolymers are melted or dissolved in a suitable solvent, such as dimethyl formamide or dimethyl acetamide, and combined with the liquid, respectively melted, or with the chain extension means dissolved in the same or other solvent. The conversion preferably takes place at temperatures between approximately 70 and 150° C., in particular at approximately 80 to 135° C. Preferably a polyaddition catalyst, in particular dibutyltin dilaurate or dibutyltin diacetate is used. The melted or dissolved prepolymer is preferably added to the diamine or diol in order to avoid undesirable side reactions of excess isocyanate groups with already formed urea or urethane groups with the formation of cross linkages. To achieve a chain length of maximum size it is moreover desirable that the prepolymer and the chain extender be converted in such quantitative ratio that stoichiometric quantities of isocyanate functions and amine or hydroxy functions react with one another. The required quantity of chain extenders can be calculated from the originally used molar ratio of diisocyanate and macrodiol. Those quantities of diisocyanate are not taken into consideration, which are lost through impurities or traces of moisture. It is therefore preferred to determined the isocyanate group content of the prepolymer, for example, through titration and to calculate therefrom the required quantity of chain extenders.

In particular when using unsaturated diol chain extenders it is preferred to carry out the prepolymer synthesis as well as also the chain extension substantially in the absence of solvents.

In individual cases circumventing the prepolymer stage is also possible ("one shot-process"). Herein the diisocyanate reacts simultaneously with the macrodiol and the chain extenders. The reaction can take place in the melt as well as also in a suitable solvent.

Polyurethane elastomers according to the invention can be processed through conventional shaping or spinning methods, preferably through melt-spinning into a fiber, respectively through melt-extrusion into a film. Fibers produced in this way exhibit advantageous elastic properties, in particular favorable values of tensile strength, elongation at tear, residual elongation and heat distortion temperature (HDT).

To further improve the mechanical textile properties of the films, respectively threads, formed from the polyurethane elastomers according to the invention the covalent cross linkage of the double or triple bonds incorporated into the polymer chains is induced. To this end, the formed films, respectively threads, are exposed to high-energy radiation. The fibers, respectively the film, is treated with electron beams or UV rays. This secondary treatment leads to a marked improvement of the values for tensile strength, elongation at tear, residual elongation and heat distortion temperature of the fiber. A qualitative demonstration of the cross linkage is the extensive insolubility in solvents, such as dimethylacetamide of the irradiated fibers. While nonirradiated fibers are already after a short time dissolved in dimethylacetamide, the electron-irradiated fibers remain largely insoluble with the retention of their elastic properties.

The invention will now be explained in further detail in conjunction with embodiment examples and the enclosed FIGS. 1 to 6.

EXAMPLE 1

A) Prenolymer Synthesis

Polytetramethylene glycol (0.5 mole) with a molecular weight of 2000 was melted at 80° C. and placed into a dry flask provided with stirre, reflux condenser, nitrogen inlet and dropping funnel. Under a nitrogen stream and while stirring, hexamethylene diisocyanate (0.75 mole) were added dropwise at 60° C. over a period of 20 minutes. The reaction mixture was heated to 125° C. and agitated for 2 hrs at this temperature. After cooling, the reaction mixture was diluted with dimethyl acetamide.

B) Determination of NCO Content in Prepolymers

To a precisely weighed quantity prepolymer solution were added 10 ml chlorobenzene as well as 2 ml of a 10% by weight dibutyl amine solution (in chlorobenzene). The mixture was stirred for 10 min. After adding 30 ml methanol and 5 drops of a 0.1% by weight solution of bromophenol blue (in methanol), the remaining content of dibutylamine solution was determined through titration with 0.1 n hydrochloric acid. A color change took place in the two-phase system from bright blue to green. In a blind test the procedure was carried out analogously to the above specifications, however without prepolymer solution. The isocyanate content was calculated as follows:

$$\text{NCO (wt. \%)} = \frac{(A-B) \cdot n \cdot 42.02 \text{ mg (NCO)} \cdot 100\%}{\text{weighed portion prepolymer (mg)}}$$

$A$ = consumption of hydrochloric acid (ml) in the blind test $B$ = consumption of hydrochloric acid (ml) in the prepolymer sample $n$ = normality of hydrochloric acid solution 42.02 = weight of isocyanate group C) Calculation of the Required Quantity of Chain Extenders After determining the isocyanate content the quantity of chain extender required for the production of the elastomer was calculated according to following formula:

$$g(KV) = \frac{MG(KV) \cdot \text{wt. \% NCO} \cdot \text{quantity prepolymer (g)}}{2MG(NCO)100\%}$$

$MG(KV)$ = molecular weight of chain extender (g/mole)

Wt. % NCO = isocyanate content in wt. %

$MG(NCO)$ = molecular weight of isocyanate group (g/mole)

D) Chain Lengthening

From the content of macrodiisocyanate in the polymer solution the required quantity of diaminomaleic acid dinitrile was calculated. The total quantity of DMA was selected such that therefrom a 20% polymer solution resulted. To a solution of diamino maleic acid dinitrile and of 1 g dibutyltin dilaurate in DMA heated to 100° C. the prepolymer solution was added dropwise over a period of 2 hr while stirring. The mixture was agitated for 2 hr at 100° C. and stored under nitrogen. The produced polymer was precipitated in water and freeze-dried for 48 hrs.

EXAMPLE 2

Melt-Spinning

For melt-spinning the freeze-dried polyurethane elastomer was cut into pieces and placed into the plunger of a plunger-type spinning machine (Maschinen und Anlagen fur synthetische Fasern, Fa. Emil Blaschke & Co. GmbH, Stuttgart, Endersbach). The material was melted in the plunger at 160° C. and spun at 170° C. through a spinning nozzle (16 holes, hole diameter 100 μm). The exit rate was 2.10 m/min. The obtained filaments were wound at 250 m/min onto the spool of a batch winder.

EXAMPLE 3

Electron Beam Curing

The electron irradiation was carried out with an electron beam curing system ESH 150 (Dürr Anlagenbau GmbH). The radiation dose was 100 kGy.

EXAMPLE 4

Force Elongation Measurements of Fibers

The force elongation measurements were carried out with a tensile-testing machine Model 1435 by Zwick. All measurements were performed under normal climatic conditions. The measuring methods were oriented along DIN 53835. To determine the tensile strength and the elongation at tear, the following machine parameters were selected:

| | |
|---|---|
| Free clamping length: | 50 mm |
| Initial [stressing] force: | 0 N |
| Testing rate: | 500 mm/min |

The residual elongation was determined following DIN 53835 Part 2. The fibers were stressed through five cycles of loading/unloading between constant elongation limits. The machine recorded the first and fifth loading and unloading cycle. The diagram showed the residual elongation and the mechanical textile characteristic factor $b_{w,5}$. The residual elongation $e_{1/5Rest}$ is the ratio of the residual length change $\Delta l$ in the first, respectively fifth, elongation cycle to the original measured length $l_0$ of the sample. The dimensionless characteristic factor $b_{w,5}$ describes the relative force reduction between the first and the fifth elongation cycle. The following machine parameters were selected:

| | |
|---|---|
| Free clamping length: | 100 mm |
| Elongation: | 300% |
| Initial stressing force: | 0.01 cN/tex |
| Testing rate: | 500 mm/min |
| Number of elongation cycles: | 5 |

The results are summarized in Tables 1 and 2.

TABLE 1

Tensile Strength and Elongation at Tear of the Fibers

| | Titer (dtex) | Tensile Strength (cN/tex) | Elongation at Tear (%) |
|---|---|---|---|
| Fiber, before radiation | 190 | 2.7 | 581 |
| Fiber after irradiation with 100 kGray | 190 | 3.5 | 686 |

TABLE 2

Residual Elongation and Characteristic Factor $b_{w,5}$ of the Fibers

|  | $e_{1, Rest}$ (%) | $e_{5, Rest}$ (%) | $b_{w,5}$ |
|---|---|---|---|
| Fiber before radiation | 13 | 21 | 0.19 |
| Fiber, irradiated with 100 kGray | 11 | 18 | 0.24 |
| Comparison fiber, not irradiated*[)] | 67 | 137 | 0.19 |
| Comparison fiber irradiated with 100 kGray*[)] | 27 | 44 | 0.21 |
| Commercially available fiber**[)] | 21 | 30 | 0.32 |

*[)]Wet-spun comparison fiber of diphenylmethane-4,4'-diisocyanate and polytetramethylene glycol (molecular weight 2000) as well as diamino maleic acid dinitrile as chain extender, produced according to F. Hermanutz, P. Hirt, Chemiefasern/Textilind. 96 (1994), 388–391.
**[)]Dry-spun comparison fiber of diphenylmethane-4,4'-diisocyanate and polyether glycol as well as ethylene diamine as chain extender.

Table 1 shows that irradiation leads to improved mechanical fiber properties.

Table 2 shows the excellent mechanical properties of the melt-spun fibers according to the invention in comparison to the commercially available dry-spun and wet-spun comparison fibers. The fiber according to the invention shows already in the non-irradiated state markedly lower residual elongation and a lower characteristic factor $b_{,5}$ than the commercially available fiber. The wet-spun comparison fiber shows with as well as also without irradiation markedly more unfavorable residual elongations.

EXAMPLE 5

A) Prepolymer Preparation 16.8 g HDI (0.1 mole) were added at ambient temperature to 100 g polyester diol (Kurapol P 2010 mw=2000 g/mole) (0.05 mole) and heated to 130° C. while stirring the mixture vigorously. To complete the reaction, stirring took place for an additional 1.5 hr at this temperature. After concluding the reaction, the reaction mixture was cooled to ambient temperature, the residual isocyanate content was determined titrimetrically and, based on this determination, the required quantity of chain extender was calculated. For the present batch a residual isocyanate content of 3.5 wt. % was obtained. When using butene diol as the chain extender the quantity of chain extender calculated therefrom was 4.29 g butene diol (0.049 mole). This corresponds to an OH/NCO ratio of 1:1.

The obtained prepolymers can be converted directly with the chain extender or can be stored under an argon atmosphere for several weeks.

B) Chain Extension Step 116 g prepolymer were placed into a Teflon vessel and heated to 70° C. The calculated quantity of butene diol (4.29 g) was added while the mixture was vigorously agitated. In addition, 25 ppm dibutyltin diacetate were added. The reaction mixture was agitated for an additional 20 min, in the process of which the viscosity increased strongly. To complete the reaction, the polymer was kept at 70° C. for 70 hours.

The butyne diol and butane diol-extended polyurethane were treated analogously. By varying the molar ratio of Kurapol/HDI/diol, polyurethanes with different hard segment contents were produced. The polyurethanes with a higher hard segment content were produced in a one-shot process. In the one-shot process the macrodiol is placed in a vessel and heated to 60° C. The calculated quantity of diisocyanate is subsequently added over a period of 15 min while the mixture is agitated. Subsequently the required quantity of chain extender, in which the catalyst (dibutyltin diacetate) had previously been dissolved, is added over a period of 15 min while the mixture is agitated. Depending on the reactivity of the chain extender, curing subsequently takes place for 60 min at 80 to 120° C.

From the produced polyurethane melt-spun fibers were produced. The spinning parameters were: feed quantity 1,04 g/min; draw-off rate 6–11.2 m/min; dwelling time 0.5 h; titer 900–1700 dtex; spinning temperature 110–160° C. in the range of the particular melt peak maximum. The produced fibers were subjected to electron irradiation with a radiation dose in the range of 0–200 kGy. Subsequently the temperature resistance (HDT temperature) as well as the mechanical properties (residual elongation, tensile strength) of the polyurethanes were determined. To determine the HDT, the device DMA7 (Perkin Elmer) was used. The fibers were clamped into the fiber holder and tested in TMA mode. The heating rate was 5° C./min, the temperature range 20° C. to 200° C. and the load force 0.002 cN/dtex. As HDT temperature that temperature was recorded at which the slope is 0.8% elongation per ° C. The following tables and figures list the results of the measurements.

| Molar Ratio Kurapol/HLI/Diol | Hard Segment Content [wt. %][4] | Production Process |
|---|---|---|
| 2/3/1 | 6 | Prepolymer |
| 1/2/1 | 11 | Prepolymer |
| 1/2.5/1.5 | 15 | One Shot |
| 1/3/2 | 19 | One Shot |
| 1/4/3 | 26 | One Shot |

| Molar Ratio: Kurapol P 2010/HDI/Diol | Production process | $\eta\ rel^1$ Kurapol/ HDI/ Butane diol | $\eta\ rel^1$ Kurapol/ HDI/ Butane diol | $\eta\ rel^1$ Kurapol/ HDI/ Butyne diol |
|---|---|---|---|---|
| 2/3/1 (6%) | Prepolymer | –[2] | 2.37[3] | 2.30[3] |
| 1/2/1 (11%) | Prepolymer | –[2] | 1.93[3] | 1.81[3] |
| 1/2.5/1.5 (15%) | One Shot | –[2] | — | 1.44 |
| 1/3/2 (19%) | One Shot | –[2] | 1.39 | 1.30 |
| 1/4/3 (26%) | One Shot | –[2] | 1.38 | 1.40 |

[1]0.5 wt. % in DMA
[2]Polymer insoluble
[3]Polymer largely dissolved, swelled particles were filtered out
[4]Calculated according to the following formula: %HS = 1/m[n(Kv) · MW(DI) + m(Kv)] · 100 where: n(Kv)=quantity of chain extender substance [mole];
MW(DI)=molecular weight of diisocyanate;
m(Kv)=mass of chain extender [g];
m=mass of total batch [g].

Heat Distortion Temperature (HDT)

| Chain Extender (HS) | Radiation Dose (kGy) | | | | |
|---|---|---|---|---|---|
|  | 0 | 50 | 100 | 150 | 200 |
| Butane diol (11%) | 100 | 87 | 88 | 79 | 67 |
| Butene diol (19%) | 108 | — | 115 | — | 180 |
| Butyne diol (15%) | 84 | — | 158 | — | 175 |

It can be seen that the HDT of the butane diol-extended polyurethane becomes degraded with increasing radiation dose. The HDT of the butene diol, respectively butyne diol, extended polyurethane, in contrast, is markedly increased through irradiation.

Figure 1:
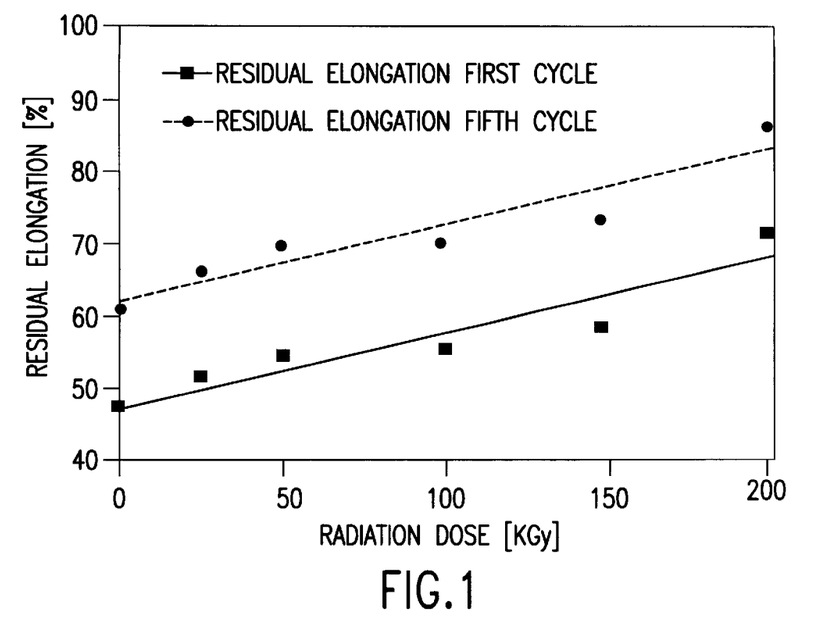
FIG. 1 shows the profile of the residual elongation in the first and fifth loading cycle as a function of the radiation dose with the electron irradiation of a butane diol chain-extended polyurethane fiber.
Figure 2:
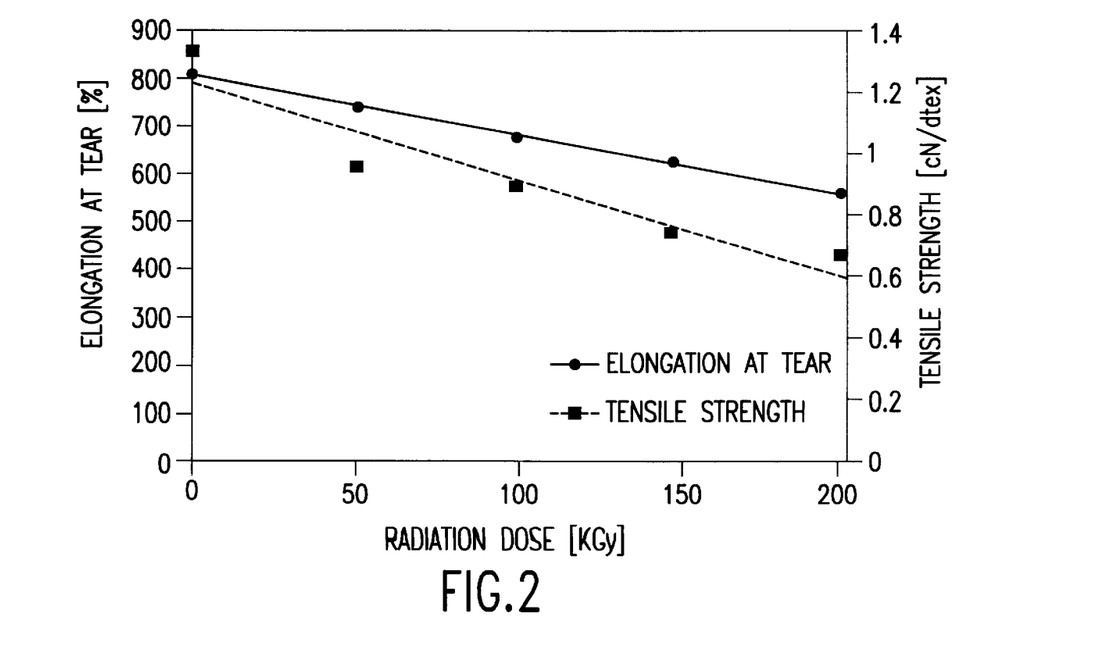
FIG. 2 shows the profile of the elongation at tear and tensile strength as a function of the irradiation dose of the same polyurethane fiber.

FIGS. 1 and 2 show that the ESH irradiation of a butane diol-extended fiber (with 11 wt. % hard segment content)

leads to a degradation of the mechanical properties. FIG. 1 shows that with increasing radiation dose the residual elongation increases. FIG. 2 shows that elongation at tear and tensile strength decrease with increasing radiation dose. This worsening of the mechanical properties can be traced back to fiber damage through breakage of the chain.

Figure 3:
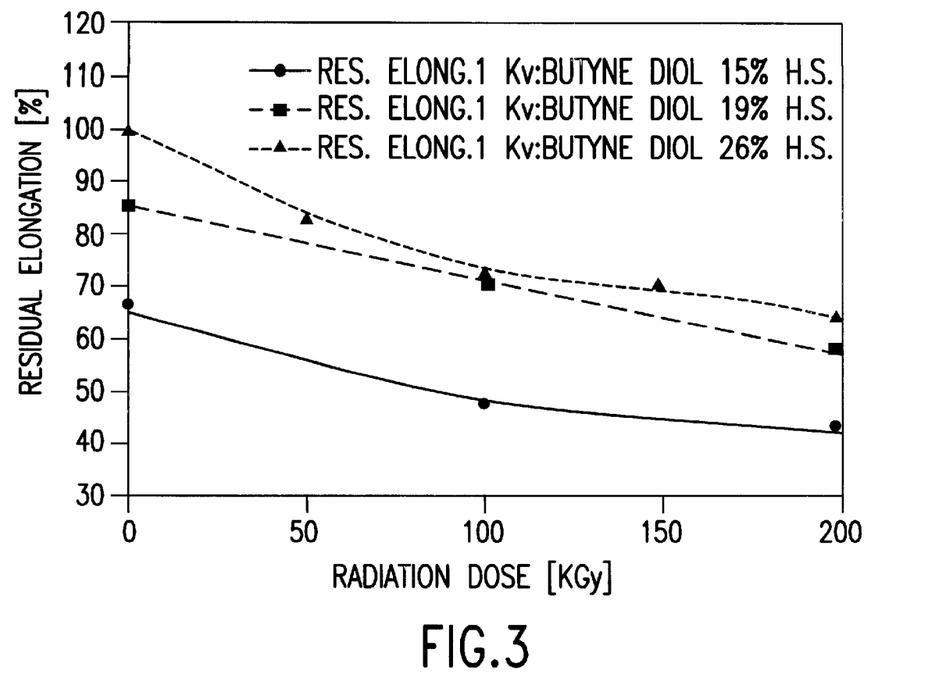
FIG. 3 shows the profile of the residual elongation after the first, one
Figure 4:
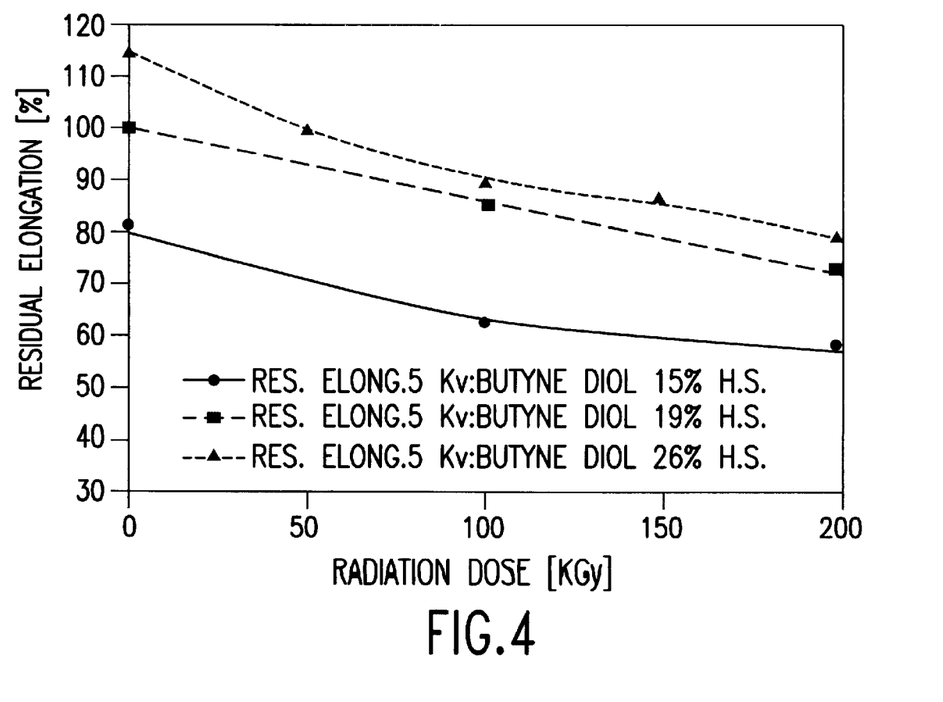
FIG. 4 shows the profile of the residual elongation after the fifth elongation cycle as a function of the radiation dose during the electron irradiation of a butyne diol chain-extended polyurethane fiber.

FIGS. 3 and 4 show that in the case of a butyne diol-extended fiber, in contrast, through the irradiation the values of the residual elongation after the first and fifth elongation cycle are improved. Irradiation leads to a covalent cross linkage of the hard segments which prevents the chains from sliding off upon elongation.

Figure 5:
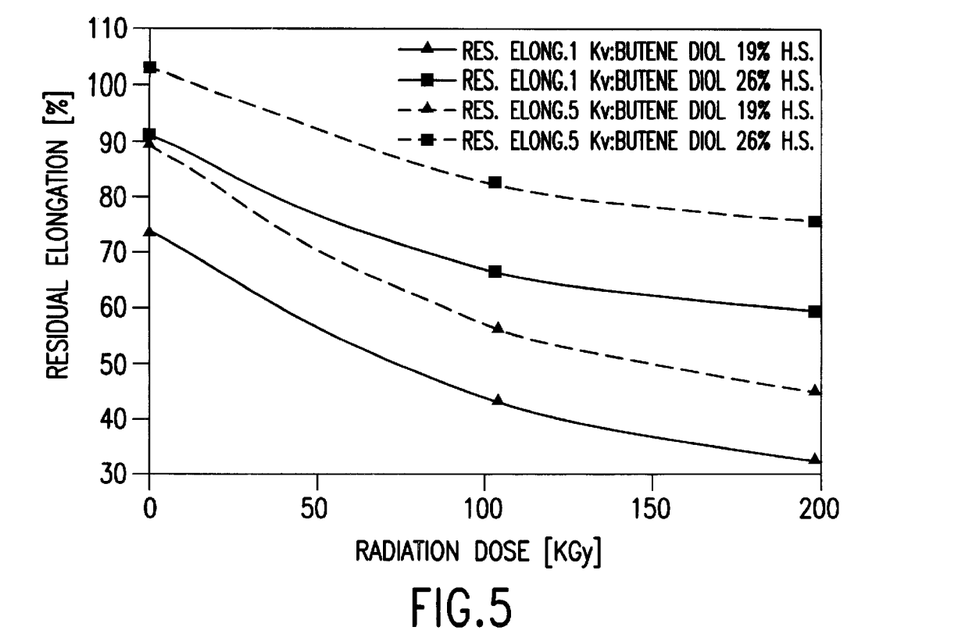
FIG. 5 shows the profile of the residual elongation in the first and fifth loading cycle as a function of the radiation doses during the electron irradiation of a butene diol chain-extended polyurethane fiber and FIG. 6 the profile of the elongation and tensile strength as a function of the radiation dose of the same fiber.
Figure 6:
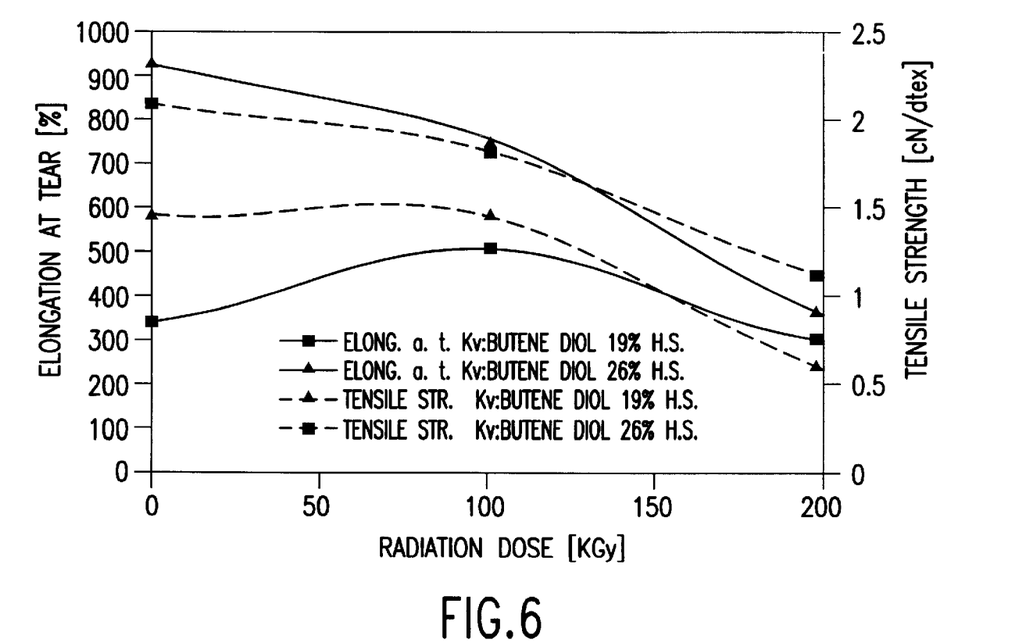

FIGS. 5 and 6 show that even with a butene diol-extended polyurethane fiber the mechanical properties can be improved through irradiation. FIG. 5 shows that after irradiation, in comparison to the non-irradiated fiber, lower values are obtained for residual elongation. FIG. 6 shows that the values of the elongation at tear and tensile strength upon irradiation with low radiation doses initially increase but decrease above 100 kGy.

What is claimed is:

1. Elastomeric fibers prepared by
   1) melt spinning a polyurethane elastomer comprising structural units of:

wherein the grouping —O —$R^1$ —O— is a macrodiol group having a molecular weight of 500 to 10000, X is an olefinically unsaturated moiety, Y is NH and each Y is on each side of X, $R^2$ is a member selected from the group consisting of bivalaent aliphatics, cycloalipbatics, aliphatic-cycloaliphatic groups and mixture thereof, n is an integer from 1 to 10, m is an integer of at least 4, said olefinically unsaturated moiety X being derived from a diaminoalkene, diaminoalkyne, diaminocycloalkene or a mixture thereof, wherein the diaminoalkene is cis- or trans-1,4-diaminobut-2-ene, cis- or trans-4,4'-diaminostilbene, a diamino maleic acid dinitrile or a mixture thereof, the diaminoalkyne is 1,4-diaminobut-2-yne and the diaminocycloalkene is 3,6-diaminocyclohexene-(1), whereby fibers are obtained; and 2) exposing said fibers to high-energy radiation in order to cross-link the polyurethane elastomer at least partially.

2. The elastomeric fibers as claimed in claim 1 wherein the fibers obtained in step 1) are treated with electron beams or UV radiation in step 2).

3. The elastomeric fibers as claimed in claim 1 wherein the macrodiol has a molecular weight of 1000 to 3000.

4. The elastomeric fibers as claimed in claim 1 wherein the macrodiol is a polyether glycol, a polyester glycol or a mixture thereof.

5. The elastomeric fibers as claimed in claim 4 wherein the polyether glycol is a polyalkylene glycol.

6. The elastomeric fibers as claimed in claim 5 wherein the polyalkylene glycol is a member selected from the group consisting of a polyethylene glycol, a polypropylene glycol, a polytetramethylene glycol and a mixture thereof.

7. The elastomeric fibers as claimed in claim 4 wherein the polyester glycol is the polyester of an aliphatic or a cycloaliphatic dicarboxylic acid and a diol or a mixture of the aliphatic and cycloaliphatic dicarboxylic acid and a diol.

8. The elastomeric fibers as claimed in claim 7 wherein the dicarboxylic acid is succinic acid, glutaric acid, adipic acid, pimelic acid, azelaic acid or sebacic acid or a mixture thereof.

9. The elastomeric fibers as claimed in claim 7 wherein the diol is a member selected from the group consisting of ethylene glycol, diethylene glycol, triethylene glycol, propylene glycol, 1,4-butane diol, 1,5-pentane diol, 1,6-hexane diol and mixtures thereof.

10. The elastomeric fibers as claimed in claim 1 wherein the group $R^2$ is a member selected from the group consisting of an alkylene group with 2 to 14 carbon atoms, a cycloalkylene group with 5 to 8 carbon atoms, an aliphatic-cycloaliphatic group with 7 to 24 carbon atoms and mixtures thereof.

11. The elastomeric fibers as claimed in claim 10 wherein the group $R^2$ is derived from a hexamethylene diisocyanate or dicyclohexylmethane-4,4'-diisocyanate or a mixture thereof.

12. The elastomeric fibers as claimed in claim 1 which comprise an additive which is a member selected from the group consisting of delustering agents, color pigments, antioxidation agents, thermostabilizers, photo-stabilizers, hydrolysis stabilizers and mixtures thereof.

13. A polyurethane elastomer suitable for processing in a melt spinning process, said polyurethane elastomer comprising structural units of formula wherein the grouping —O—$R^1$—O— is a macrodiol group with a molecular weight from 500 to 10000, $R^2$ is a member selected from the group consisting of a bivalent aliphatic, cycloaliphatic, aliphatic-cycloaliphatic group and mixtures thereof, X is an olefinically unsaturated group, Y is NH and each Y is on each side of X, n is an integer from 1 to 10, and m is an integer of at least 4, said olefinically unsaturated moiety X being derived from a diaminoalkene, diaminoalkyne, diaminocycloalkene or a mixture thereof, wherein the diaminoalkene is cis- or trans-1,4-diaminobut-2-ene, cis- or trans-4,4'-diaminostilbene, a diamino maleic acid dinitrile or a mixture thereof, the diaminoalkyne is 1,4-diaminobut-2-yne and the diaminocycloalkene is 3,6-diaminocyclohexene-(1).

14. A polyurethane elastomer as claimed in claim 13 wherein the macrodiol has a molecular weight of 1000 to 3000.

15. A polyurethane elastomer as claimed in claim 13 wherein the macrodiol is a polyether glycol, a polyester glycol or a mixture thereof.

16. A polyurethane elastomer as claimed in claim 15 wherein the polyether glycol is a polyalkylene glycol.

17. A polyurethane elastomer as claimed in claim 16 wherein the polyalkylene glycol is a polyethylene glycol, a polypropylene glycol, a polytetramethylene glycol or a mixture thereof.

18. A polyurethane elastomer as claimed in claim 15 wherein the polyester glycol is the polyester of an aliphatic or a cycloaliphatic dicarboxylic acid or a mixture thereof with a diol.

19. A polyurethane elastomer as claimed in claim 18 wherein the dicarboxylic acid is succinic acid, glutaric acid, adipic acid, pimelic acid, azelaic acid, sebacic acid or a mixture thereof.

20. A polyurethane elastomer as claimed in claim 18 wherein the diol is ethylene glycol, diethylene glycol, triethylene glycol, propylene glycol, 1,4-butane diol, 1,5-pentane diol, 1,6-hexane diol or a mixture thereof.

21. A polyurethane elastomer as claimed in claim 13 wherein the moiety $R^2$ is an alkylene group with 2 to 14 carbon atoms, a cycloalkylene group with 5 to 8 carbon atoms, an aliphatic-cycloaliphatic group with 7 to 24 carbon atoms or a mixture thereof.

22. A polyurethane elastomer as claimed in claim 21 wherein the moiety $R^2$ is derived from hexamethylene diisocyanate, dicyclohexylmethane-4,4'-diisocyanate or a mixture thereof.

23. A polyurethane elastomer as claimed in claim 13 wherein at least two polyurethane chains are covalently cross-linked with one another through the group X.

24. A polyurethane elastomer as claimed in claim 13 which comprises an additive which is a member selected from the group consisting of delustering agents, color pigments, antioxidation agents, thermostabilizers, photostabilizers, hydrolysis stabilizers and mixtures thereof.

25. A method for the production of a polyurethane elastomer as claimed in claim 13 which comprises the steps of
   a) reacting a macrodiol with a diisocyanate OCN—$R^2$—NCO wherein $R^2$ is a member selected from the group consisting of bivalent aliphatics, cycloaliphatics, aliphatic-cycloaliphatic groups and mixture thereof at a molar ratio of approximately 1:5 to 1:1.1 to obtain a prepolymer and
   b) reacting the residual isocyanate content of the prepolymer with an olefinically unsaturated diamine.

26. The method as claimed in claim 25 wherein step a) is carried out in the absence of a solvent and step b) in the presence of a solvent.

27. The method as claimed in claim 25 wherein step b) is carried out in dimethyl formamide or dimethyl acetamide or a mixture thereof.

28. The method as claimed in claim 25 wherein in step b) the prepolymer is added to the diamine.

29. The method as claimed in claim 25 wherein steps a) and b) are substantially carried out in the absence of a solvent.

30. The method as claimed in claim 25 wherein the molar ratio of the macrodiol to diisocyanate in step a) is between 1:2 and 1:1.5.

31. The method as claimed in claim 25 wherein in step b) a polyaddition catalyst is used.

32. A method of forming fibers which consists of melt extruding or melt spinning a polyurethane elastomer according to claim 13.

33. The method according to claim 32 wherein said films or fibers are cross-linked at least partially by exposure to a high energy radiation.

34. The method of improving the tensile strength, elongation at tear, residual elongation and heat distortion temperature of the films or fibers obtained according to claim 33 which consists of exposing said films or fibers to electron beams or UV radiation.

35. Elastomeric fibers prepared according to the method of claim 32.

* * * * *